Patented Nov. 26, 1946

2,411,666

UNITED STATES PATENT OFFICE 2,411,666

MOLDING COMPOSITION AND THE ARTICLE PRODUCED THEREBY

Jean B. Monier, Galt, Ontario, Canada

No Drawing. Application October 7, 1943, Serial No. 505,388. In Canada April 30, 1943

4 Claims. (Cl. 106—217)

This invention relates to improvements in molding compositions and in products made therefrom and the primary object of the invention is to provide molding compositions which may be converted by compression, injection or extrusion molding to coherent masses varying from physically soft and elastic to physically hard and rigid and having qualities of tensile strength, elasticity, dielectric strength, resistance to oxidation, sunlight, water, moisture, oils, greases, acids, alkalis, gases, heat and cold and abrasion rendering them useful for many purposes for which rubber and various synthetic resinous materials are now used. A further object is to provide molding compositions which may be converted to thermoplastic masses and molding compositions which may be converted to infusible, insoluble masses. Various other objects and the advantages of the invention may be ascertained from the following description.

The invention consists, broadly speaking, in molding compositions and products made therefrom comprising as an essential ingredient thereof, an unsaturated carbohydrate derivative, the said derivative being either thermoplastic or thermosetting, alone or admixed with one or more of fillers, plasticizers, lubricants, colouring agents, accelerators, anti-oxidants, retardants and vulcanizing and other agents.

In greater detail the invention consists in the features and combinations of features herein disclosed, together with all such modifications thereof and substitutions of equivalents therefor as are within the scope of the appended claims.

The fundamental or essential component of the molding compositions and of the products made therefrom, which component is hereinafter termed the "basic material," is, selectively, either of two types of carbohydrate derivatives preferably derivatives of a cellulose such as cotton, wood pulp, wood flour or sawdust, but may be a derivative of starch or of a protein. One of these materials is a thermoplastic obtained by hydrogenating and ethylating the raw material until the same behaves as a paraffin and then dehydrogenating and ethylating the paraffin-like material until the same becomes unsaturated and behaves as a member of the olefine series, or of a higher series. The thermoplastic basic materials and the method of making them are disclosed in my copending application Serial No. 505,383 filed coincidently with this application. The other of the basic materials is a thermosetting material derived from the first material by treating the same with prepared hydrocarbon gas under pressure. The thermosetting basic materials and the method of making them are disclosed in my copending application Serial No. 505,384, filed coincidently with this application.

One manner of producing the aforesaid thermoplastic basic material is as follows: A pure, sufficiently alkalized or ethylated cellulose, that is, one having substantially no free hydroxyl content, is hydrogenated by passing through the mass of alkali cellulose, at a pressure of 5 to 10 pounds p. s. i. superatmospheric and at room temperature, a current of dry hydrogen gas, preferably in the presence of an excess of an ethylating agent, for approximately one hour, or until the hydrogenation and ethylation attain the desired degree, as determined by a test showing the change taking place in the ethoxyl content, which should attain a substitution of between 48% and 50%. The degree of hydrogenation should be at least equal to 14% to 16% of the original hydrogen content. The ethylating agent may be either aliphatic or aromatic and is preferably a compound with a halogen or with sulphur. The ethylating agent may be used in vapour form, such as vapour of ethyl chloride or ethyl sulphate or ethyl benzene, and passed with the hydrogen; or the ethylating agent may be in liquid form, previously admixed with the alkali cellulose, for instance benzyl chloride or a higher alkyl halide such as n-propyl chloride, n-butyl chloride, n-hexyl chloride or n-amyl chloride. If the starting material has been ethyl cellulose or a cellulose ether, the ethylating components of the mixture may be omitted if the hydroxyl substitution is approximately 50%. During the reaction, some halogenation of the alkali cellulose occurs if the ethylating component includes a halide.

The product resulting from the foregoing treatment is now mixed with any suitable proportion, for instance an approximately equal weight, of an alcohol mixture containing a reagent having a reactive ethylenic group, and preferably containing a catalyst. The mixture now preferred is about 50% methyl alcohol and 50% ethyl alcohol, with about 25% to 30% of its weight of acetone, preferably in the form of its sodium compound, a suitable olefin and a catalyst. The proportions of pre-treated cellulose and alcohol are not significant as long as an excess of alcohol is present. The proportions of the alcohols in the mixture may vary between, say, 40% methyl to 60% ethyl, and 60% methyl to 40% ethyl, with preference for at least 50% ethyl content.

Since the result desired from treating the cellulosic material with an ethylenic body is an increase in the carbon content of the molecule and the removal of hydrogen atoms by substitution of olefin groups for hydroxyl and ethoxyl groups, it is desirable to use a body of as high molecular weight as is practicable. Olefins, such as hexylene, heptylene and octylene, have been found satisfactory, but it will be understood that the process is not confined to the use of these olefins, nor even to olefins, as the use of members of the acetylene series is contemplated. Alternatively, one may use a high weight paraffin instead of an olefin.

The catalyst now preferred is ortho-phosphoric acid alone or admixed with one or more of the salts, such as the phosphates or sulphates, of heavy metals selected from groups III′, IV′ and VI′ of the periodic system, for instance, chromium, copper, nickel, palladium and platinum, in amount of approximately 1% of the weight of the reaction mixture. Other acids and other metals which will promote hydrogenation and ethylation and will not be detrimental to the final product may be used, but sulphuric acid is to be avoided.

It has been found that satisfactory results are obtained by mixing the phosphoric acid and the olefin in the proportion of approximately 60% acid to 40% olefin and using an amount of this mixture equal to about 20% of the dry weight of the cellulosic material, but the proportions may be varied. The amount of acid as above is 12% on the cellulosic material but may be higher or may be as low as will permit of an efficient and high substitution of the ethoxyl and hydroxyl groups by olefin groups. The metal salts are preferably added at the time of, or after, the addition of the acid to the reaction mixture.

The reaction mixture is heated at a pressure of 25 to 50 pounds p. s. i. superatmospheric for approximately one hour, care being taken that the temperature does not rise above 25° to 30° C. At the end of this time the pressure is released and the reaction mixture is refluxed for approximately 2 hours at a temperature equal to, or slightly above, the highest boiling temperature of the alcohol. The exact period is determined by tests for the extent of substitution. Suitable tests are pH determination, viscosity and solubility and a calculation of the free hydroxyl groups, preferably by the acetylation method, which should show substantially no free groups. The pH should be between 11 and 12. The viscosity should be 600 to 700 centipoises in 5% concentration. A satisfactory substitution is indicated by a molecular refraction between 28 and 29.

During the refluxing, dehydrogenation occurs. The reaction is believed to be removal of two hydrogen atoms from the glucose residue, which may be regarded as a cellulosic monomer, and the splitting off of water from the alcohol with resultant formation of an unsaturated olefin which substitutes the hydrogen. If it is desired to avoid a change in the number of carbon atoms during dehydrogenation, secondary alcohol may be used instead of primary alcohol. Dehydrogenation is facilitated by the addition of 1% to 5% (based on the weight of the reaction mixture) of a selenium salt, such as the chloride. Other metals or salts known as dehydrogenation catalysts, which do not have undesirable reaction may be used.

It will be understood that during the treatment with alcohol and olefins, some aldehydization occurs by reason of conversion of alcohol to aldehyde (ketone in the case of a secondary alcohol) and it is believed the aldehyde or the ketone groups attach to some extent to the cellulosic molecule.

It is further to be understood that all the steps of hydrogenation, dehydrogenation and ethylation hereinbefore described are carried out with exclusion of air.

When the reaction has progressed to a suitable extent, as determined by one or more of the foregoing tests, the reaction mixture is subjected to a high vacuum until the mass is completely dehydrated.

A thermoplastic basic material suitable for use according to this invention, made from cotton linters as aforesaid, is identified as a substantially water-white, transparent solid having a specific gravity of 1.14 to 1.16; a softening point of approximately 110° C.; a melting point of approximately 135° C. and a molecular refraction of 28.62. Thermoplastic material made from wood pulp, wood flour or sawdust, as above, is yellowish to brown in colour and translucent to opaque and has other characteristics substantially the same as the material made from cotton. These thermoplastic materials are very flexible and have tensile strength, dielectric strength and inductance-conductance values superior to those of rubber. They are soluble in most alcohols, esters, ethers, ketones, hydrocarbon and chlorinated hydrocarbon solvents and in many mixed solvents but are insoluble in water, cyclohexanol, diacetone alcohol, ethyl ether, methyl Celloselve, Carbitol, high flash naphtha, dipentene, turpentine, petroleum ether, hexane and Varsol. They are substantially unaffected by water, moisture, oils, greases, most acids, alkalis, gases, sunlight and oxygen. They are compatible with oils such as castor, linseed, soyabean and cottonseed but not with large amounts of paraffin wax, ceresin or ozokerite, or with cellulose acetates or nitrates.

One manner of producing a thermosetting basic material as previously referred to is as follows. A thermoplastic material produced as previously described is placed in an autoclave and heated to a temperature of approximately 150° C. until the material liquifies. During or after the heating, the material is placed under pressure of 50 to 75 pounds p. s. i. superatmospheric and an excess of a previously prepared hydrocarbon gas, which may be a single gas or a mixture of gases, is blown through the liquid mass, maintained under the pressure and at the temperature above stated, for approximately 3 hours, or for such time as is necessary to produce the desired vulcanizable product. The reaction temperature may be lower or higher than stated above, say, between 125° and 175° C. It will be understood that the time of reaction depends primarily upon the rate of hydrocarbon gas input and absorption, and to a lesser extent on the pressure and temperature. If the gas input is below the rate of possible absorption, the reaction will require a longer time. The gas input should be in excess of the possible absorption and the unabsorbed excess of gas may be recirculated through the reaction.

A sufficient extent of reaction is determined by tests for pH, specific gravity and by examination of samples for tensile strength and molecular refraction. The pH should be on the alkaline side and normally between 8 and 9 but may vary somewhat from this range, according to the hydrocarbon gas which has been combined. The specific gravity should be between 1.01 and 1.04, and the molecular refriction approximately 42.35. The practical test is to mill-dry a sample with sulphur, vulcanize it and then determine the tensile strength. This is conclusive as to the suitability of the product for the use to which it is to be put. If the specific gravity is too high or the refraction lower than given or if the tensile strength is not sufficient, the reaction should be continued until the desired values are attained. It will be understood that the extent of reaction is not necessarily always the same but that the reaction is carried to a point at which the product is suitable for the use in view. The foregoing tests indicate a material suitable for general use.

The aforesaid previously prepared hydrocarbon gas is obtained, broadly speaking, by passing a body, or mixture of bodies, containing an alkyl or an alkylene radical, in contact with a catalyst at high temperature. The types of bodies thus contemplated for use are principally alcohols (including glycols and glycerols), aldehydes and ketones of the aliphatic series, also certain members of the aromatic series. The bodies now preferred are ethyl alcohol or methyl ethyl ketone or a mixture of them. According to the method now preferred, either of these bodies, or a mixture of them, preferably in 85% to 90% concentration, is vapourized (with exclusion of air) and the vapour is heated to approximately 450° C. The hot vapour is passed (with exclusion of air) in contact with a catalyst in a chamber heated to a temperature between 350° and 450° C. and then through a cooler maintained at a temperature of approximately 0° C. to separate unconverted alcohol (or ketone) from the gaseous hydrocarbons which have been produced. The hydrocarbons desired for reaction with the thermoplastic cellulose derivative are principally unsaturated. The temperature of the conversion should be carefully controlled. Too high a temperature results in the production of normally liquid hydrocarbons useless for the purpose of this process, while too low a temperature results in the production of gaseous hydrocarbons of lower range than are required. A temperature as high as 440° C. has been found satisfactory with nickel apparatus. With glass lined apparatus, the temperature should be lower, say, 375° to 400° C. Unconverted alcohol recovered from the cooler may be recycled through the conversion chamber, care being taken that the refluxing does not reduce the concentration in the vapourizer below 85% to 90%. Yields of 45% to 50% are obtained if the temperatures are maintained as previously stated. The pressure in the conversion chamber is approximately 700 mm. of mercury, being the sub-atmospheric pressure created by the gas and vapour passing through the cooler. The exact composition of the gas mixture thus obtained has not been accurately determined but it is believed to be 35% to 40% 1.3-butadiene, some pseudo butylene and various other hydrocarbons. The composition of the gas mixture may be varied by using alternatives for the alcohol and ketone or by using various mixtures of materials of the types herein disclosed.

The catalyst now preferred for the conversion of the alkyl or alkylene containing body or bodies is alumina gel or silica gel or nickel powder, but any other catalyst known for the activation of vapour phase reactions of hydrocarbons, such as aluminum oxide (impure form) or zinc oxide (pure form), which will serve and which will not be detrimental to the final product, may be used.

A thermosetting basic material suitable for use according to this invention, made from cotton linters as aforesaid, has, prior to hardening or vulcanization, the same colour and transparency characteristics as the thermoplastic material from cotton and is a slightly tacky, semi-solid which has no softening point and which commences to harden by polymerization when heated above 200° C. The specific gravity is 1.02 to 1.04 and the molecular refraction is 42.35. Thermosetting material made from wood flour, wood pulp or sawdust is yellowish to brown in colour and translucent to opaque and has other characteristics substantially the same as the material made from cotton. These thermosetting basic materials have high tensile strength, flexibility and elasticity. They are capable of being vulcanized with sulphur or other vulcanizing agents at temperatures of 220° to 235° C. to produce masses ranging from physically soft, very flexible and elastic to physically hard and rigid, according to the amount of vulcanizing agent used and the duration and intensity of the heating. The unpolymerized and unvulcanized thermosetting materials have the solubilities, insolubilities, compatibilities and incompatibilities hereinbefore stated for the thermoplastic materials. The vulcanized thermosetting basic materials are infusible and insoluble and are substantially unaffected by water, moisture, oils, greases, most acids, alkalis, gases, sunlight and oxygen. They have tensile strength, dielectric strength and conductance-inductance values superior to those of rubber.

Molding compositions composed of the thermoplastic basic material, either alone or admixed with one or more of fillers, plasticizers and other agents, may be molded by compression or by injection or by extrusion and will yield, according to the ingredients and the proportions thereof, coherent molded masses varying from soft and pliable to hard and rigid, which are proof against water, moisture, oils, greases, alkalis, most acids, gases and the action of sunlight and the atmosphere. These masses have high tensile strength and may have dielectric strength and other electrical characteristics superior to those of rubber, according to the composition. The masses which do not contain filler or colouring matter may be substantially water-white and transparent.

Molding compositions composed of the thermosetting basic material and a vulcanizing agent, either by themselves or admixed with one or more of fillers, plasticizers and other agents, may be molded by comparison or by extrusion followed by vulcanization and will yield, according to the ingredients and the proportions thereof and according to the temperature and the duration of the vulcanizing treatment, coherent molded masses varying from soft, pliable and elastic to hard and rigid, which are infusible and insoluble and are proof against water, moisture, oils, greases, alkalis, most acids, gases and the action of sunlight and the atmosphere. The soft pliable masses may have a high degree of elongation and good elastic memory. All have high tensile strength. The masses may have dielectric strength and other electrical characteristics superior to those of rubber, according to the composition thereof. The masses which do not contain filler or colouring matter may be substantially water-white and transparent.

The molding compositions and the molded masses of the invention comprise the thermoplastic basic material or the thermosetting basic material with a vulcanizing agent or either of the foregoing admixed with one or more of fillers, plasticizers, lubricants, pigments, dyes, hardeners, anti-oxidants, retarders and other agents in a wide range of proportions. For instance, 100 parts of either the thermoplastic basic material or the thermosetting basic material may be admixed with one or more of the following, the proportions being by weight.

5 to 200 parts of filler such as china clay, whiting, talc, lithopone, carbon black, wood flour, sawdust, cork, or cellulose flake, mica, asbestos or cotton flock;

1 to 100 parts of plasticizer such as one or more of pine oil, hydrogenated pine oil, monobromated camphor, benzyl thiocyanate, dibenzyl amyl naphthalene, dibenzyl ether, dibenzyl sebacate, dibutyl metacresol, dibutyl phthalate, dibutyl diphthalate, dioctyl phthalate, glycerol triacetate, tributyl glycerol naphthalate, tributyl acotinate, tributyl phosphate, tricresyl phosphate, phosphated castor oil, methyl abietate, ethyl abietate, ethyl resinoleate, glycerol chlorbenzoate, glycerol chlordibenzoate, glycerol monoisopropyl ether, castor oil, linseed oil, or soyabean oil;

½ to 5 parts of lubricant such as stearic acid, zinc stearate or aluminum stearate;

½ to 5 parts of hardening agent such as magnesium oxide or zinc oxide, or both, with a small percentage of retardant such as aluminum acetate if magnesium oxide is used;

½ to 5 parts of anti-oxidant such as chlorbenzoate, benzyl mercaptan or benzothiazyl disulphide;

½ to 15 parts of accelerator such as zinc oxide.

When the molding compositions include the thermosetting basic material, there must be added from 1 to 5 parts of sulphur or a suitable amount of other vulcanizing agent. Compositions including relatively large amounts of plasticizer require more vulcanizing agent than those including a relatively small proportion of plasticizer.

It will be understood the invention is not limited to the foregoing admixed agents nor to the proportions thereof to one another or to the basic material.

The method now preferred for making the molding compositions is to warm the basic material and reduce it to the consistency of a stiff dough by means of a roll mill or other suitable mixing machine, and then to incorporate plasticizer, filler and other agents with the basic material by continued operation of the mixing apparatus until a completely homogenous mass is obtained. The preferred warming and mixing temperatures are: for mixtures including the thermoplastic basic material, between 170° and 180° F., but not over 200° F.; and for mixtures including the thermosetting basic material, between 110° and 120° F., but not over 140° to 145° F. The larger the proportion of plasticizer in the mixture, the lower the mixing temperature may be. Adequate cooling of the mixing apparatus is necessary both during the warming of the basic material and during the admixing therewith of the other ingredients, as both of the basic materials tend to heat rapidly during mixing. When relatively large amounts of filler are admixed with the basic material, or when for any other reason it is desired to do so, a wetting agent may be added during the mixing to facilitate the same. The wetting agent should be quite volatile to ensure that none remains in the mixture when the same is molded. If it is desired that the molded mass be transparent, non-polar wetting agents should be used, as polar agents tend to cause blushing or clouding of the mixtures, which may not disappear completely during the molding operations. Suitable wetting agents are ethyl acetate, ethyl lactate, acetone, methyl ethyl ketone, methyl alcohol, benzene, xylene and toluene.

The mixtures are finally made into sheets or slabs which, on cooling, are more or less hard, according to composition. Molding compounds of the thermoplastic basic material which include less than 5% of plasticizer, or less than 10% of plasticizer and a relatively large amount of filler, especially mineral filler, may, after chilling, be comminuted to granular or pulverulent form. A comminuted mixture having a grain size 0.05 inch, or smaller, is free flowing and does not agglomerate if maintained at a temperature below 150° F.

The manner of making molded masses from molding compositions including the thermoplastic basic material follows in general the usual practice of resin molding, while the manner of making molded masses from molding compositions including the thermosetting basic material follows in general the usual practice of molding rubber compositions.

The molding compositions including the thermoplastic basic material may be molded at temperatures between 200° and 500° F., according to the relative amounts of basic material, plasticizer and filler and the type of molding, the tendency being that larger proportions of plasticizer permit lower molding temperatures while larger proportions of filler for a given amount of plasticizer require higher molding temperatures. For injection or extrusion molding, the thermoplastic compounds are charged to the molding machine, or to a preheater, in either the comminuted form or the slab form and are heated to a temperature at which the compounds are sufficiently fluent, preferably from 350° to 400° F. The die of the injection machine and the head of the extrusion machine should be kept at a temperature of approximately 100° to 110° F. Pressure of 4,000 to 30,000 pounds p. s. i., according to the fluency of the composition and the size of the mold in the case of injection molding, is applied. The hot molding composition is cooled and hardens practically instantly, by contact with the relatively cold die or mold and is expelled from the machine. For compression molding, the slab material is warmed to a temperature of from 200° to 450° F., according to the composition of the compound and the type of molds, and cut into pieces of sufficient size to fill the molds. These pieces, while still hot, are fed to the molds which are maintained at a temperature of 100° to 110° F. and pressure of 4,000 to 40,000 pounds p. s. i., according to the composition and temperature of the compound and the size of the mold, is applied for 3 to 10 minutes according to the size of the masses being molded. The molds chill the molded material to sufficient form stability to permit removal when the molds are opened.

The molding compositions including the thermosetting basic material may be extrusion molded at temperatures between 110° and 230° F., according to the relative amounts of basic material, plasticizer and filler; the greater the amount of plasticizer, the lower the molding temperature and the greater the amount of filler, the higher the temperature for any given amount of plasticizer. The molding pressure may be any pressure required to effect extrusion, usually between 2,500 and 4,000 pounds p. s. i., according to the plasticity of the compound. After extrusion, the molded product is vulcanized by heating at a temperature between 200° and 300° C. for 20 to 60 minutes, according to the composition of the molding mixture and the degree of physical hardness required in the product. These compositions also may be molded by the compression method, the molding temperature being between 200° and 300° C., according to the composition of the molding mixture, the molding pressure and time and the hardness required in the product, the tendency being that higher temperatures are required for larger proportions of filler, or if harder products are desired. The molding pressure may be between 4,000 and 40,000 pounds p. s. i., according to the composition of the molding compound, the size and intricacy of the mold and the final hardness desired. The pressure and temperature are maintained for 20 to 60 minutes and the molds are then opened and the molded masses removed and allowed to cool. As the moldings including the thermosetting basic material have been vulcanized during the molding period, they are completely form stable when removed from the molds, even though they are still hot.

When the molding compounds include pigments or dyes, the molding temperature is, in all cases, governed to some extent by the heat resistance of the colours.

Under proper conditions of temperature and pressure, the molded masses reproduce perfectly the form and finest details of the molds. With proper conditions of pressure and temperature and proper amounts of plasticizer, the molded products are uniformly dense and free from voids, bubbles or blisters and when proper amounts of lubricant are used, the molded masses do not adhere to the molds.

The degree of physical hardness of the molded masses depends primarily upon the proportion of plasticizer to basic material, and to lesser extent upon the nature of the filler and the proportion thereof to basic material. In the case of molded masses including the thermosetting basic material, the physical hardness depends also, to some extent, on the amount of vulcanizing agent included and on the temperature and duration of the vulcanizing treatment. In general, the greater the proportion of plasticizer in the molding compound, the softer will be the molded mass; while, conversely, the greater the amount of filler for any given amount of plasticizer, the harder will be the molded mass. Also, the greater the amount of vulcanizing agent or the time or temperature of vulcanization, the harder will be the molded mass. In general, compositions including from 1% to 15% of plasticizer, on the amount of basic material, will produce molded masses which may be described as hard to firm; while compositions including from 15% to 100% of plasticizer, on the amount of basic material, will produce molded masses which may be described as firm to soft. To facilitate understanding of the description herein, it may be stated that the term "soft" is used to indicate a degree of hardness approximating that of a mass of foamed or sponge rubber; while the term "firm" is used to indicate a degree of hardness approximating that of automobile tire treads; and the term "hard" is used to indicate a degree of hardness materially greater than that of tire treads but falling short of rigidity.

The following examples, in which the parts are by weight, are illustrative of the invention, but it will be understood the invention is not limited to these examples or to the details thereof.

Example 1.—A molding compound consisting of the thermoplastic basic material made from cotton linters, admixed with 1% of stearic acid, is heated to a temperature of 350° to 400° F. and molded by injection under pressure of 4,000 to 30,000 pounds p. s. i., according to the size of the mold, or by extrusion under pressure of 2,000 to 3,000 pounds p. s. i. The molded mass is substantially water-white and transparent and is very tough, strong and hard, the hardness by Shore test being approximately 100. The mass can be sawed, drilled and otherwise worked by hand and machine tools and can be polished. The mass has dielectric strength and other electrical properties superior to those of rubber. If from 1% to 5% of dibutyl or dioctyl phthalate is added to the compound, the molded mass will be similar to the foregoing but somewhat less hard, being 90 to 80 by the Shore test.

Example 2.—A molding compound consisting of 100 parts of thermoplastic basic material; 15 parts of dibutyl phthalate; 10 parts of zinc oxide and 1 part of stearic acid is heated to a temperature of 250° to 300° F. and is molded by injection or by extrusion, as described in Example 1. The molded mass is very tough and strong and is about as hard as an automobile tire tread. The electrical characteristics are superior to those of rubber.

Example 3.—A molding compound consisting of 100 parts of thermoplastic basic material; 20 parts of dioctyl phthalate and 1 part of stearic acid is heated to approximately 250° F. and is molded by extrusion or by injection, as described in Example 1. The molded product is similar to that of the previous examples, except that it is softer, having a hardness of approximately 60 by Shore test. If the amount of plasticizer is increased to 50 parts, the hardness drops to approximately 20 by Shore test.

Example 4.—A molding compound consisting of 100 parts of thermoplastic basic material; 5 parts of dibutyl phthalate; 50 to 100 parts of filler such as wood flour; 2 parts of stearic acid and 5 parts of zinc oxide is heated to a temperature of 350° to 450° and is molded by injection or by extrusion at a pressure of 10,000 to 40,000 pounds p. s. i. The molded mass is strong, tough and hard, the hardness being 80 to 100 by Shore test, according to the pressure.

Example 5.—Slabs of molding compound according to any of Examples 1, 2 or 3 are heated to a temperature between 200° and 225° F. or slabs of compound according to Example 4 are heated to a temperature between 250° and 300° F. The slabs are cut into pieces of molding size and are molded by compression under pressure of 10,000 to 20,000 pounds p. s. i. for 3 to 10 minutes, according to size. The resulting molded masses are similar to the masses produced according to Examples 1 to 4, respectively.

Example 6.—A molding compound consisting of 100 parts of thermosetting basic material; 15 parts of zinc oxide; 2.5 parts of benzothiazyl disulphide; 3.5 parts of sulphur; 120 parts of carbon black; 1 part of stearic acid and 5 parts of dibutyl phthalate is heated to a temperature of approximately 310° F. and is molded by extrusion or by compression under pressure of 10,000 to 35,000 pounds, p. s. i. and held at this pressure and temperature for 45 minutes. The resulting molded mass is hard, tough and strong. The stress at 300 pounds p. s. i. is 3220; the ultimate tensile strength is 4225 pounds p. s. i.; the elongation is 210%; the Shore hardness is 97 and the rebound 6.

Example 7.—A molding compound consisting of 100 parts of thermosetting basic material; 5 parts of zinc oxide; 1 part of phenyl-beta-naphthylamine; 1.5 parts of benzothiazyl disulphide; 1.5 parts of sulphur; 50 parts of channel black; 1 part of stearic acid and 50 parts of soft coal tar is heated to a temperature of approximately 310° F. and is molded by extrusion or by compression, as described in Example 6, except that the vulcanizing time is only 30 minutes. The resulting molded mass is much softer than the product of Example 6 and is firm, tough, strong and highly elastic. The stress at 300 pounds p. s. i. is 300; the ultimate tensile strength is 2,600 pounds p. s. i.; the elongation is 695%; the Shore hardness is 60 and the rebound 18.

Example 8.—A molding compound consisting of 100 parts of thermosetting basic material; 5 parts of zinc oxide; 1 part of phenyl-beta-naphthylamine; 2 parts of benzothiazyl disulphide; 3 parts of sulphur; 50 parts of channel black; 1.5 parts of stearic acid and 100 parts of dibutyl phthalate is heated and molded by extrusion or compression, as described in Example 7. The resulting molded mass is very soft, the hardness approximating that of foamed or sponge rubber. The stress at 300 pounds p. s. i. is 400; the ultimate tensile strength is 900 pounds p. s. i.; the elongation is 400%; the Shore hardness is 40 and the rebound is 58.

Having thus described my invention, I claim:

1. A molding composition comprising a cellulosic derivative resulting primarily from treating a cellulosic ether substantially free from hydroxyl content under pressure with hydrogen until at least about 15% hydrogenation results and then condensing the mass with alcohol and an olefin having molecular weight from approximately 84 to approximately 112 and subsequently dehydrogenating the mass by refluxing at a temperature approximately equal to the highest boiling temperature of the alcohol until it becomes unsaturated; a plasticizer for said derivative and a filler, said plasticizer and said filler being incorporated to the derivative by mixing the same together at a temperature between 110° and 200° F.

2. A thermoplastic molding composition comprising a cellulosic derivative resulting from treating a cellulosic ether substantially free from hydroxyl content under pressure with hydrogen until at least about 15% hydrogenation results and then condensing the mass with alcohol and an olefin having molecular weight from approximately 84 to approximately 112 and subsequently dehydrogenating the mass by refluxing at a temperature approximately equal to the highest boiling temperature of the alcohol until it becomes unsaturated, the said derivative having a specific gravity of 1.14 to 1.16; a plasticizer for said derivative and a filler, said plasticizer and said filler being incorporated to the derivative by mixing the same together at a temperature between 170° and 200° F.

3. A thermosetting molding composition comprising a cellulosic derivative resulting from treating a cellulosic ether substantially free from hydroxyl content under pressure with hydrogen until at least about 15% hydrogenation results, condensing the mass with alcohol and an olefin having molecular weight from approximately 84 to approximately 112, dehydrogenating the mass by refluxing at a temperature approximately equal to the highest boiling temperature of the alcohol until it becomes unsaturated and finally reacting the mass with an unsaturated hydrocarbon gas prepared by catalytic action under pressure and at high temperature on a reagent selected from the group consisting of alcohols, aliphatic aldehydes and ketones, the said derivative having a specific gravity of 1.02 to 1.04; a plasticizer for said derivative, a filler and a vulcanizing agent, the said derivative, plasticizer, filler and vulcanizing agent being incorporated to a homogeneous mass by mixing the same together at a temperature between 110° and 145° F.

4. An infusible, insoluble, molded product comprising a cellulosic derivative resulting from treating a cellulosic ether substantially free from hydroxyl content under pressure with hydrogen until at least about 15% hydrogenation results, condensing the mass with alcohol and an olefin having molecular weight from approximately 84 to approximately 112, dehydrogenating the mass until it becomes unsaturated and then reacting the mass by refluxing at a temperature approximately equal to the highest boiling temperature of the alcohol with an unsaturated hydrocarbon gas prepared by catalytic treatment under pressure and at high temperature of a reagent selected from the group consisting of alcohols, aliphatic aldehydes and ketones, the said derivative having a specific gravity of 1.02 to 1.04; a plasticizer for said derivative, a filler and a vulcanizing agent, the said filler, plasticizer and vulcanizing agent having been incorporated to the derivative by mixing the same together at a temperature between 110° and 145° F., the said product having been rendered infusible and insoluble by heating to a temperature between 200° and 300° C. for 20 to 60 minutes.

JEAN B. MONIER.